J. L. McWILLIAMS.
AUTOMOBILE SIGNAL.
APPLICATION FILED JAN. 25, 1919.
1,351,667.
Patented Aug. 31, 1920.
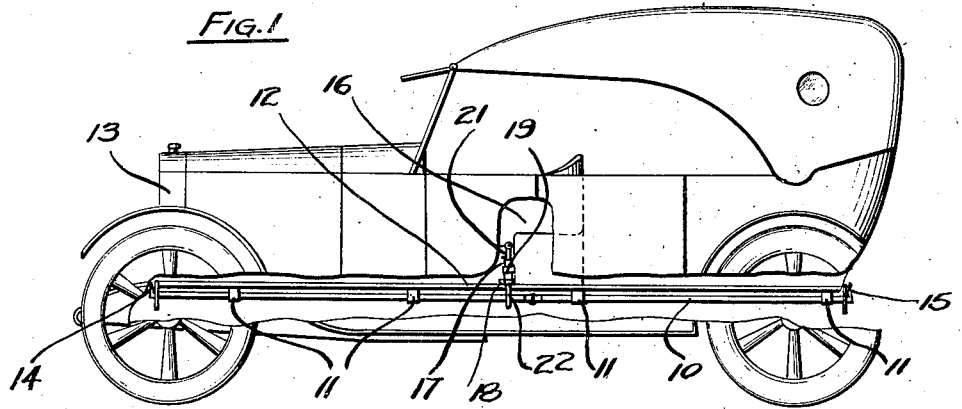
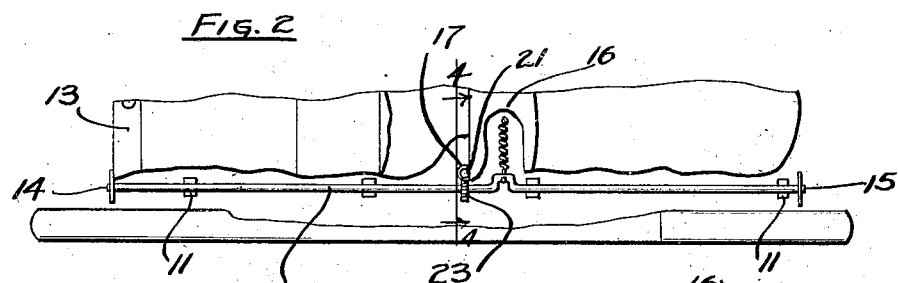
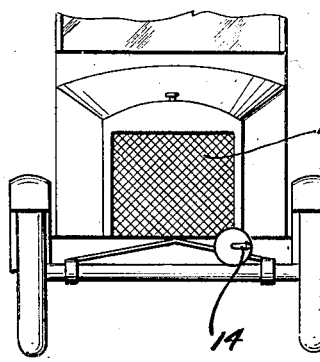
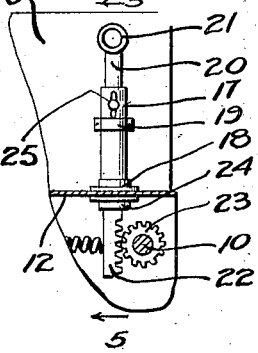
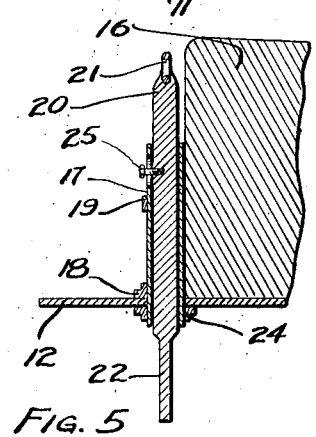
Inventor
J. L. McWilliams
Attorneys

UNITED STATES PATENT OFFICE.

JOSEPH L. McWILLIAMS, OF SAN FRANCISCO, CALIFORNIA.

AUTOMOBILE-SIGNAL.

1,351,667.   Specification of Letters Patent.   Patented Aug. 31, 1920.

Application filed January 25, 1919. Serial No. 273,058.

*To all whom it may concern:*

Be it known that I, JOSEPH L. McWILLIAMS, a citizen of the United States, residing at San Francisco, in the county of San Francisco, State of California, have invented certain new and useful Improvements in Automobile-Signals; and I do hereby declare the following to be a full, clear, and exact description of the invention, such as will enable others skilled in the art to which it appertains to make and use the same.

This invention relates to new and useful improvements in automobile signals and particularly to direction signals therefor.

One object of the present invention is to provide a novel and improved device of this character wherein the direction of change intended by the driver of a vehicle can be easily and quickly displayed to view both to vehicles approaching from the front and the rear.

Another object is to provide a novel and improved mechanism for actuating a directon indicator at the front of the vehicle and a similar arm at the rear simultaneously.

Other objects and advantages will be apparent from the following description when taken in connection with the accompanying drawing, In the drawing:

Figure 1 is a side elevation of an automobile showing my invention applied thereto.

Fig. 2 is a top plan view of the device, only such parts of the automobile being shown as are necessary to the attachment of the device.

Fig. 3 is a front elevation of the automobile showing the device in its direction indicating position.

Fig. 4 is a vertical transverse sectional view taken on the line 4—4 of Fig. 2.

Fig. 5 is an enlarged vertical sectional view taken on the line 5—5 of Fig. 4.

Referring particularly to the accompanying drawing, 10 represents a longitudinally extending shaft mounted in brackets 11 secured to the chassis of the automobile, beneath the floor 12 thereof. The forward end of this shaft extends a short distance beyond the radiator 13 of the automobile where is secured a radiating arrow-shaped arm 14. Similarly carried by the rear end of the shaft, at the rear end of the automobile, is an arrow arm 15, both of said arms being arranged to turn with the shaft. Disposed vertically through the floor of the automobile, directly in front of the driver's seat 16, is a tubular member 17, the same having the intermediate flanges 18 which are secured to the floor and the upper flanges 19 which are secured to the front of the seat box. Disposed vertically for slidable movement through this tubular member is a rod 20, the upper end being provided with a handle 21, while the lower end is formed with rack teeth 22 for engagement with a pinion 23 carried by the shaft 10, and whereby said shaft is adapted for rotation. A brace 24 is secured to the lower face of the floor of the automobile and to the tubular member to hold the latter in proper vertical position.

Thus when the driver pushes the rod 20 downwardly, the shaft 10 will be rocked in one direction to turn the arrows horizontally in one direction, while an upward pull on the rod will cause the shaft to be rocked in the opposite direction and the arrows turned to point in the opposite direction. Thus the driver can easily and quickly signal to other vehicles, either from the front or the rear, that a change of direction is to be made, and which direction is to be taken.

The device is extremely simple and cheap in construction, and can be easily and quickly applied to any of the automobiles now in use. It will be noted that the coil spring normally and yieldably holds the shaft 10 in such position that the arrows normally point straight upwardly.

A set screw 25 is carried by the rod 20 for regulating the stroke of said rod.

While I have not illustrated the use of lights for the signal I wish it understood that the lights may be incorporated in the signal and connected to the lighting system of the automobile in any desired manner.

What is claimed is:

A direction indicator for an automobile including a longitudinally extending rock shaft having a crank portion, and a pinion, a vertical tubular member mounted adjacent the seat of the driver and extending through the floor of the automobile, a radial signal arm on each end of the shaft, a vertically reciprocable rod disposed through the tubular member and having a rack engaging with the pinion, and a spring connected to the crank portion and to the automobile for yieldably returning and holding the shaft and signal arms in normal central position.

In testimony whereof, I affix my signature, in the presence of two witnesses.

JOSEPH L. McWILLIAMS.

Witnesses:
 SID S. PALMER,
 A. G. McWILLIAMS.